Figure 1:
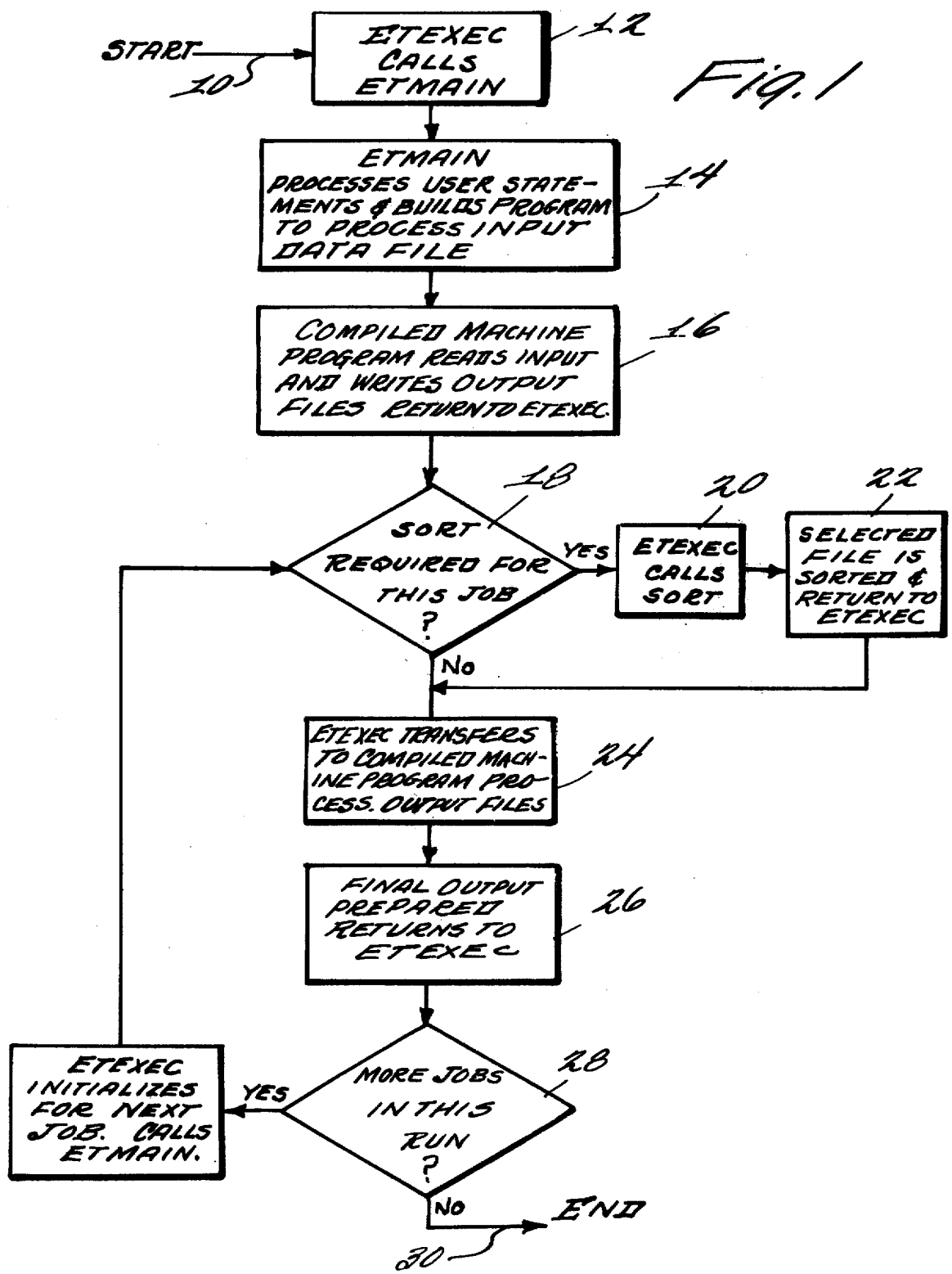

United States Patent [19]
Beckler

[11] 4,309,756
[45] Jan. 5, 1982

[54] METHOD OF AUTOMATICALLY EVALUATING SOURCE LANGUAGE LOGIC CONDITION SETS AND OF COMPILING MACHINE EXECUTABLE INSTRUCTIONS DIRECTLY THEREFROM

[76] Inventor: Robert I. Beckler, 654 Kennebec Ave., Takoma Park, Md. 20012

[21] Appl. No.: 419,496

[22] Filed: Nov. 28, 1973

Related U.S. Application Data
[63] Continuation of Ser. No. 116,160, Feb. 17, 1971, abandoned.

[51] Int. Cl.³ .............................................. G06F 3/00
[52] U.S. Cl. .................................................. 364/300
[58] Field of Search ..................... 444/1; 340/172.5; 364/300

[56] References Cited
PUBLICATIONS

Graham, R. M., "Bounded Context Translation," in AFIPS Conference Proceedings, vol. 25; 1964, Spring Joint Computer Conference, pp. 17-29.
Cheatham, T. E., Jr. and Sattley K., "Syntax-Directed Compiling", in AFIPS Conference Proceedings, vol. 25; 1964, Spring Joint Computer Conf., pp. 31-57.
Halpern, M. I., "XPOP: A Meta-Language Without Metaphysics" in AFIPS Conference Proceedings, vol. 26; 1964, Fall Joint Computer Conference, pp. 57-68.

Primary Examiner—Leo H. Boudreau
Attorney, Agent, or Firm—Larry S. Nixon

[57] ABSTRACT

A method for use under program control in a digital computer for automatically evaluating compiler level language logic condition sets and for compiling machine executable instructions directly therefrom is disclosed. More specifically, a unique method of constructing an array of novel logical linkages is described which permits an especially rapid direct compilation of an efficient and optimum-sized set of machine executable instructions without constructing the usual logic decision tables or going through an extra assembly level language step as is the case with most prior compilers. Rather, the method described generates an array of so-called primary link codes representing logical interrelationships or links between successive source deck cards in a condition set while also generating an associated array of so-called secondary link codes representing logical interrelationships or links between successive entries on the same source deck card in a condition set. These arrays are formed in such a manner that a simple analysis in terms of increasing/decreasing values of the primary and secondary link codes permits direct compilation of machine executable instructions from a computed array of incremental addresses for each term of the condition set. Further, the resulting set of machine instructions is near optimum in terms of both the core storage area utilized and the object program execution time.

24 Claims, 5 Drawing Figures

METHOD OF AUTOMATICALLY EVALUATING SOURCE LANGUAGE LOGIC CONDITION SETS AND OF COMPILING MACHINE EXECUTABLE INSTRUCTIONS DIRECTLY THEREFROM

This is a continuation, of application Ser. No. 116,160 filed Feb. 17, 1971, now abandoned.

This invention generally relates to a method of programming digital computers for automatically evaluating high level language statements and compiling a set of machine executable instructions therefrom. Such methods are usually in the form of computer programs called compilers or assemblers and permit a computer programmer to code a desired complex machine operation in a form approaching that of the English language (or other accepted human level language) without being forced to laboriously code each and every necessary minute and incremental machine operation in a detailed machine language form.

As those in the art will appreciate, the task of generating a desired set of machine language instructions for digital computer execution is one that has received a god deal of attention. All general purpose digital computers are designed to perform several fairly simple tasks such as comparing the contents of one set of storage locations with another, adding, subtracting, moving data from one storage location or register to another, etc. In addition, each of these simple tasks is designated by a predetermined code structure or "machine language" instruction code and the computer is designed to sequentially scan at least a portion of its storage locations and to sequentially execute the simple tasks represented by coded machine instructions previously stored therein. The further ability to break the sequence of this scan by programmed jumping or branching of machine control to another programmed storage location (either unconditionally or conditionally as based on the results of some previous compare operation or the contents of a certain register, etc.) makes possible rather complex computer operations wherein complex logical conditions can be evaluated with particular predetermined programmed machine operations occurring in dependence upon the outcome of logical functions.

However, as those in the art will realize, hand coding these elemental machine operations in machine language codes and keeping track of absolute core storage addresses etc. is a very laborious task.

The earliest computers required just such a laborious manual coding process and were therefore programmable only by highly trained personnel with the permissible overall program complexity being limited both economically and conceptually by the laboriously detailed work involved.

Later, the persons responsible for manually generating such machine language programs recognized that many of the steps they were performing were repetitious, readily predictable and therfore themselves machine programmable. As a result, so called assembly level programming languages were developed for use with an "assembler" or a special computer program designed to generate the necessary machine language instructions or codes from the assembly level language statements. For instance, the actual set of machine instructions for performing "X+Y=Z" might involve moving the contents of a storage location (assigned to represent X) to a certain register, moving the contents of another storage location (assigned to represent Y) to another register, combining the two register contents in an add operation, and moving the result from the proper register to yet another storage location (assigned to represent Z). The assembly level language permits the programmer to effectuate all these operations by coding a single simple entry such as, "ADD X, Y, Z". The assembler program then interprets this assembly language statement and generates all the necessary machine language instructions.

While assembly level languages were closer to the more usually understood English language, programmers were still required to learn quite a bit about the computer's more elemental operations before becoming an adept programmer even in the assembly level language. For instance, skill in the use of index registers, and knowledge of input/output devices and the interrelationships between compare switch settings and branch instructions, etc. were still necessary for the programmer. Thus, new higher level "compiler" languages were developed (i.e. FORTRAN, COBOL, etc.) to permit efficient programming with a minimum of knowledge concerning elemental machine operations. For instance, the previous computation example would be written exactly as "Z=X+Y" in FORTRAN. However, these compilers usually involve a two-step process. First, the compiler language is analyzed and an assembly level coding structure is generated. Then, this assembly level coding is analyzed to generate the actual machine language instructions. Thus, the compiler consumes more total time in processing the higher level language to result in at least one disadvantage that accompanies the desired result of realizing a higher level source language.

Further, since most compiler languages have been designed to satisfy a broad spectrum of end uses (computation, data base maintenance, report generation, on line control, etc.) the resulting generalized compiler does not always generate the most optimum machine language program in terms of size or execution speed, as will be appreciated by those in the art.

A new specialized compiler for directly generating machine language instructions (without an intermediate assembly language level step) has now been developed and is being sold under the name EASYTRIEVE. This compiler is specifically directed towards easy and efficient manipulation of and report generation from existing data files although it also permits limited creation of new files from input data. The EASYTRIEVE language is very close to the English language in form and is utilized in a free-flow form that is easily understood by managers and others having little or no previous programming experience.

The subject of this invention is a particularly advantageous and unique process employed in the EASYTRIEVE compiler for evaluating source language logic condition sets and for directly generating machine language instructions therefrom. Of course, since similar logic condition sets must often be analyzed in other compiler systems as well, the process of this invention will also find advantageous use in such other compiler systems; however, for purposes of explanation, it will be described hereafter as it relates to the EASYTRIEVE compiler.

This invention is directed to a unique method of constructing an array of novel logical linkages which is then used to rapidly and directly generate an array of incremental addresses which are, in turn, used to result in the desired machine language instructions. The linkage array includes primary link codes representing logical connections between separate successive source deck cards in a given condition set and secondary link codes representing logical connections between successive entries on the same source deck card in the condition set. The incremental addresses and hence the machine language instructions are then directly and automatically generated by analyzing the linkage array in terms of increasing or decreasing values of the primary and secondary link codes for successive array entries. Using this invention to evaluate logic condition sets, there is no need for constructing a complete logic decision table or for needlessly evaluating conditions during object program execution that have become immaterial to the final result in view of the outcomes of just previously evaluated logical conditions and their interrelationships with other conditions in the complete logic conditional set as will be more apparent from the following detailed discussion.

Figure 2:
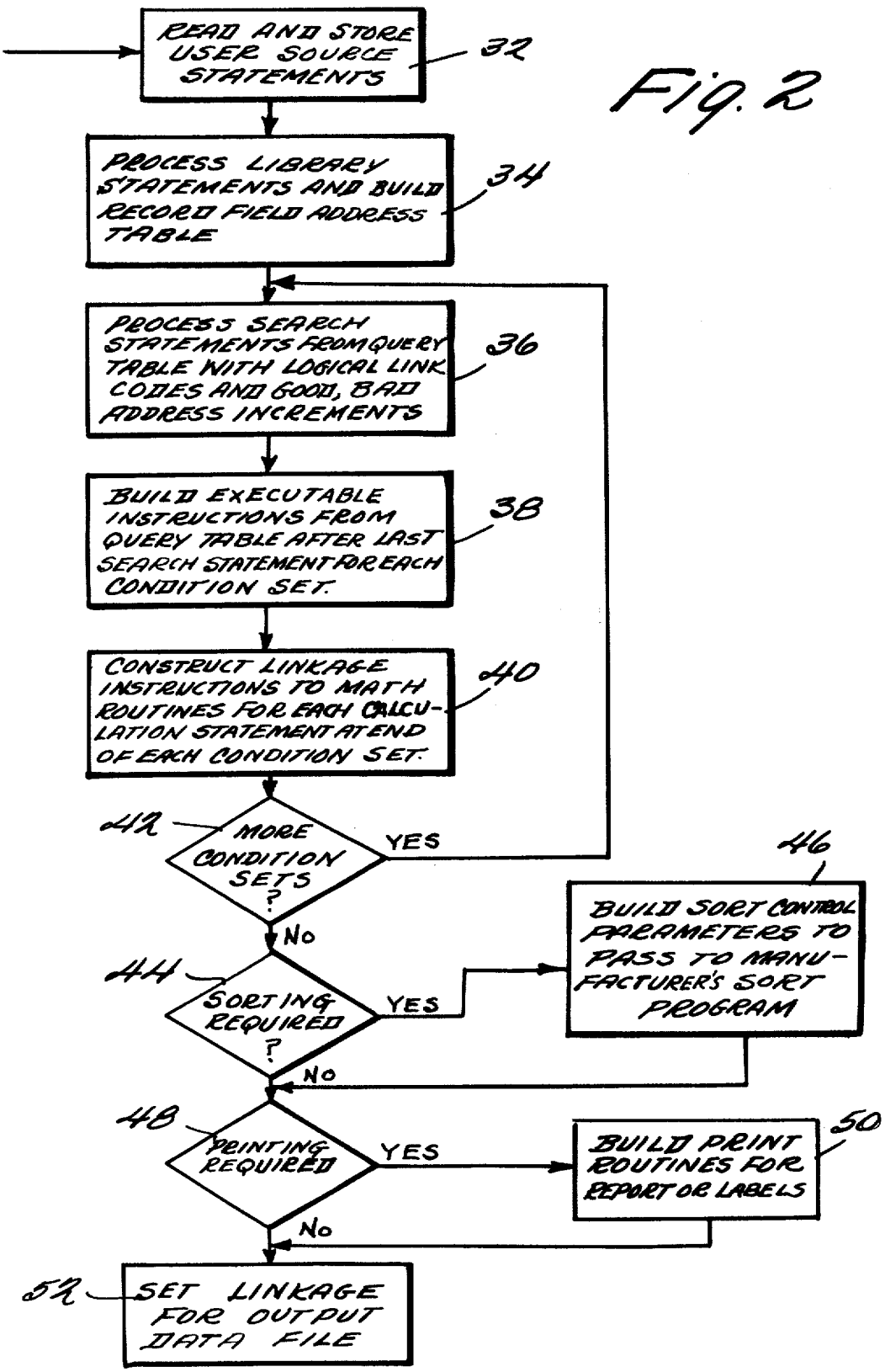
Figure 3:
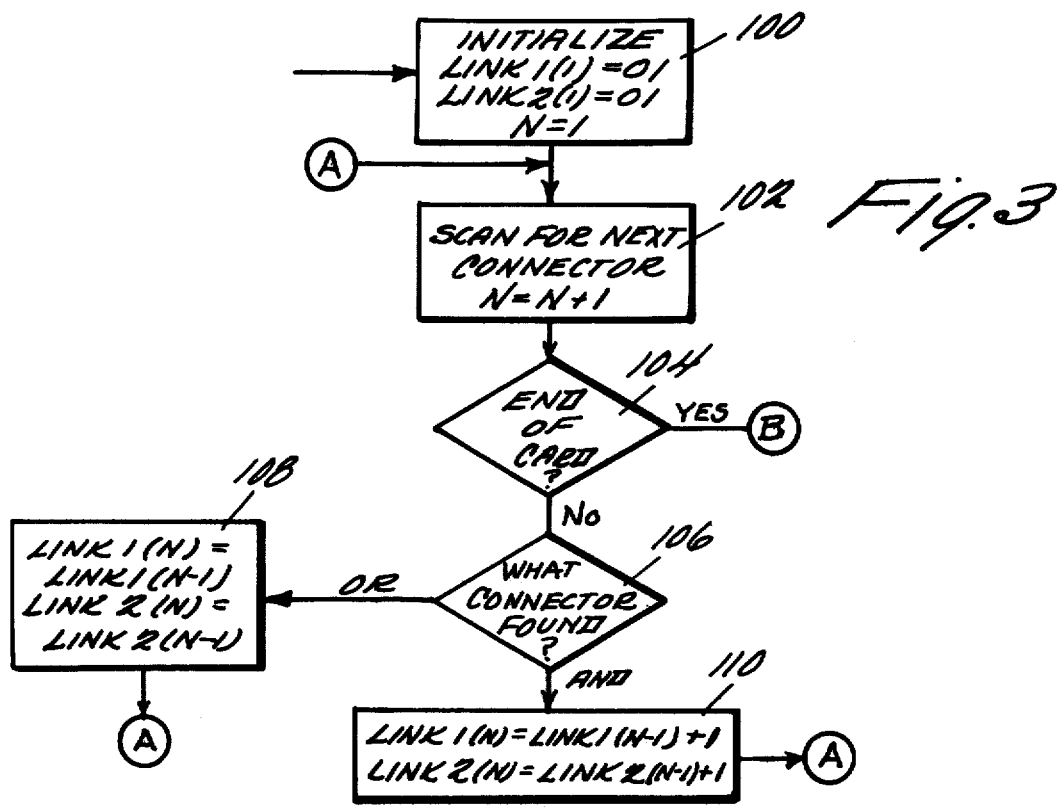
Figure 4:
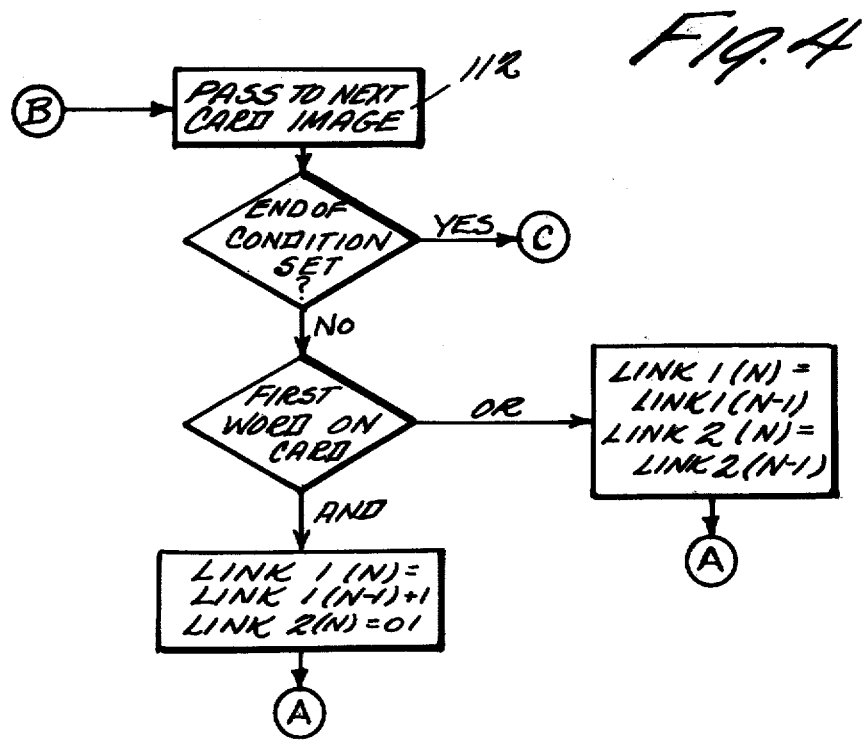
Figure 5:
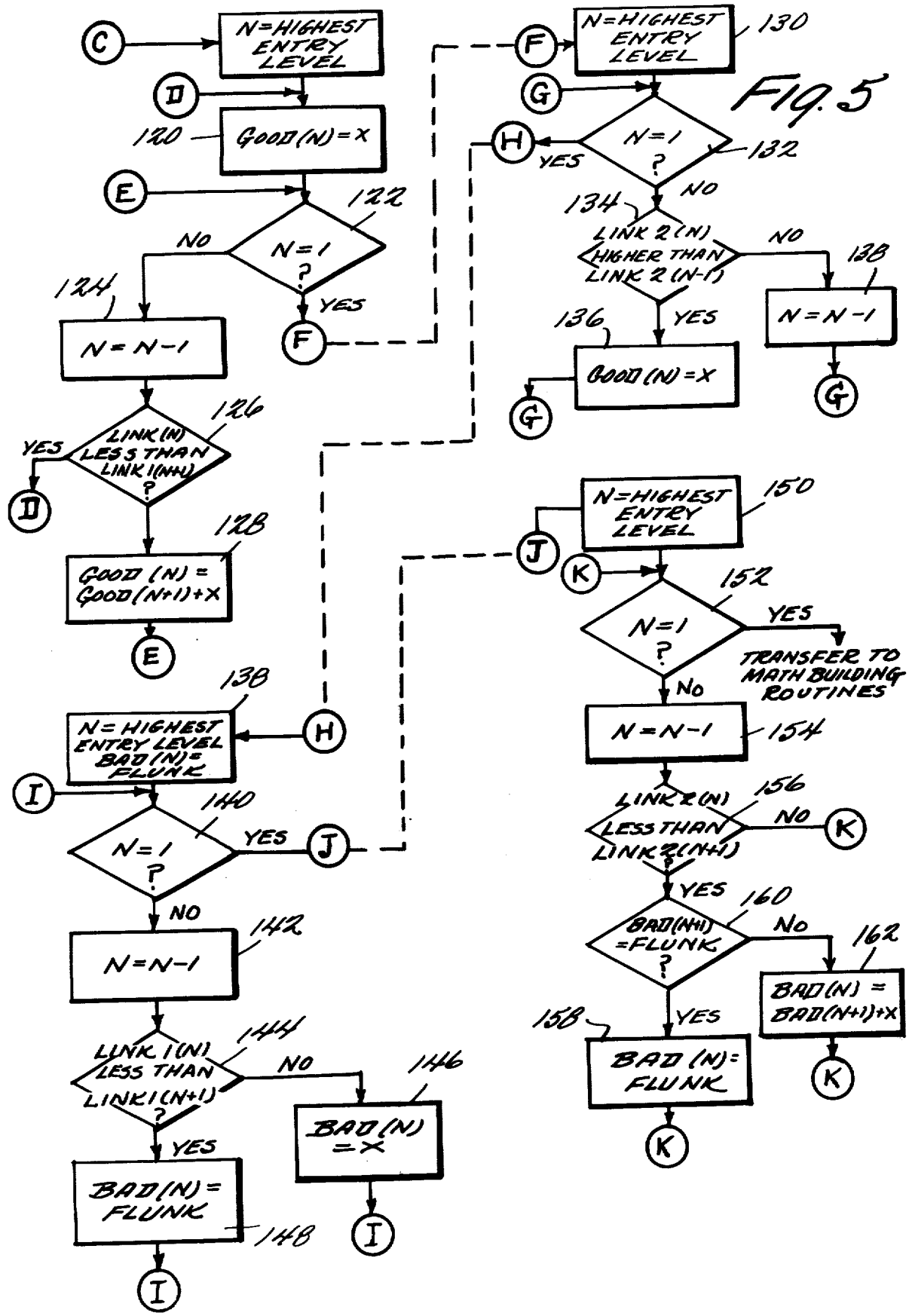

Other advantages and objects of this invention will be more fully appreciated from the following detailed description and the accompanying drawings, of which:

FIG. 1 is a flow chart representing an exemplary overall data processing system and the generalized steps occurring in the normal use of a compiler employing the process of this invention, FIG. 2 is a more detailed flow chart of an exemplary overall compiler process employing the process of this invention, FIGS 3 and 4 are more detailed flow charts showing an exemplary embodiment of the process of this invention for generating the logic linkage array, and FIG. 5 is a more detailed flow chart showing an exemplary embodiment of the inventive process for generating an associated incremental address array from the linkage array for subsequent use in forming final machine language instructions for a condition set.

As previously pointed out, the process of this invention may be incorporated in any compiler where logic condition sets of the type discussed below are evaluated and therefore, no detailed discussion of the conventional portion of the compiler is necessary for a complete understanding of this invention or to permit its practice by others skilled in the art. That is conventional methods of designing compilers and/or assemblers are well known in the art.

For instance, chapter 10 of *Computer Science: A First Course* by Forsythe, Keenan, Organick and Stenberg, 1969 published by John Wiley and Sons discusses compilers. Another reference work is *Compiling Techniques* by Frank R. Hopgood and published by MacDonald & Co., Ltd., London.

However, to generally orient this invention in its working environment, a few general comments will be presented on the EASYTRIEVE compiler which utilizes an exemplary embodiment of this invention as previously mentioned.

EASYTRIEVE is a compiler (computer program) which, when loaded into a computer, enables the machine to process requests in the form of English-like free-form source statements from both trained data processing personnel and non-data processing personnel. Upon analyzing the user's source statements, machine executable instructions are generated and stored in the computer's memory banks, machine control is then transferred to these newly generated instructions and the requested tasks are automatically carried out using the core storage area where the compiler program was originally maintained as data input/output areas. Of course, an executive routine preferably calls in the compiler program from a system library before automatically transferring control to the compiler as will be appreciated by those in the art. Likewise, after the user's requested tasks have been completed, control is preferably automatically transferred back to the executive routines, part of which may be maintained in a predetermined portion of core storage as will again be apparent to those in the art.

Basically, the exemplary compiler requires a minimum of two types of soruce statements. A first type of source statement is used to describe the essential characteristics of the input data file(s). Here the record name and length are designated as well as each necessary data field name, relative location, length and type. For instance, a typical source statement of this type might appear as follows:

PAYFILE 240 NAME 7 25 A, ORG#75 3 N, PAY 201 4 P2

This statement would mean that one of the input files is named PAYFILE and that each record in this file is 240 characters in length (irrespective of any blocking factors). Further, there are three fields in each record that are of interest for use in the particular program being written, namely, the field NAME which begins in the 7th position from the beginning of each record, has a length of 25 characters and which is composed of alpha-numeric characters; the field ORG# located at the 75th record position of length 3 and comprising numeric characters and finally, the field PAY beginning at the 201st record position of length 4 and comprising a packed field having 2 decimal places. Other fields to be referenced in this file might be given in a following source statement and the whole process would be repeated for any other input files before a special designating code (9999) is used to signify the end of data descriptive statements.

Then, the source statements must contain at least one so called logic condition set utilizing the fields described in the data descriptive statements. If the specified logical conditions are met and no other action is specified (i.e., in the default mode), the exemplary compiler automatically generates instructions that will cause the particular input record for which the conditions are met to be written on an output file.

Of course, other source statements can be inserted after a logic conditional set to cause subsequent calculations, sorting of output files and/or listing operations to be performed in addition to or in place of the default generated output file writing as should be apparent to those in the art. A more detailed understanding of the overall structure and available options for the exemplary compiler may be had from *The EASY-TRIEVE/300 User's Guide*.

Since this invention is directed to a particular process of evaluating the aforementioned logic condition sets, these compiler source statements will not be examined in more detail. Each logic condition set begins with an "IF" followed by one or more "query statements" connected by "AND" or "OR" logical connectors. Each query statement is, in turn, comprised of a left-hand field name (or constant), a relational operator and a right-hand field name (or constant) in that order. Typical relational operators are "EQ" (equal to), "GR" (greater than), "GQ" (greater or equal to), "LQ" (less or equal to) "NQ" (not equal to) and "LS" (less than), etc. as will be appreciated by those in the art. Thus a simple logic condition set might be represented by the following source statement:

IF PAY GR 50000 AND ORG# EQ 001

In the default mode where no following source statements are used, this would result in the formation of an extract output file containing all the records from PAYFILE having a PAY field contents greater than $500.00 and of course, in actual practice a single condition set would usually include several query statements on one or more separate source deck punched cards.

The usual method of evaluating such condition sets is to set up a logic decision table in which execution of the object program results in setting go—no go switches for the entire decision table before making a final judgment as to whether the complete condition set is satisfied. As those in the art will appreciate, this necessarily means that the same number of logical operations must be carried out for each record tested even though some records might obviously be evaluated as failing or "flunking" the condition set early in the operation if optimum programming were employed.

The process of this invention results in a much more efficient evaluation of such condition sets and uses less core storage to do it. The result is a near optimum machine language program for evaluating the condition set.

Basically, the process of this invention generates a unique array of logical linkage codes which inherently describes the elementary "AND" and "OR" relationships between query statements on different source deck cards (primary links) and on the same source deck cards (secondary links). Then by simply analyzing this unique array in terms of increasing and/or decreasing linkge codes, an array of incremental addresses is computed and an optimum set of machine instructions is compiled directly therefrom.

The initial primary and secondary linkage array entries for the first query statement are set to an 01 value. Thereafter, the linkage array entry for each succeeding query statement is incremental by one only if directly preceded by an "AND" connector. Primary links are therefore incremented only if the query statement under consideration is on a new card beginning with an AND connector and secondary links are incremented only if the same card is involved with two query-statements connected by an AND connector with the secondary link being reset to 01 each time a new card is encountered. As will be understood in view of the following discussion, this effectively results in understood logical parentheses around query statements on the same card.

For example, for the condition set shown below (using data fields named CODE, TYPE and CLASS) the resulting primary and secondary logical linkage array shown represents the logical function IF (CODE EQ 1) and (TYPE EQ A) OR (TYPE EQ B) OR (TYPE EQ C) AND (CLASS EQ 53)

|  |  | Linkage Array | |
|---|---|---|---|
|  |  | Primary Link | Secondary Link |
| Card #1 | IF CODE EQ 1 | 01 | 01 |
| Card #2 | AND TYPE EQ A | 02 | 01 |
| Card #3 | OR TYPE EQ B | 02 | 01 |
| Card #4 | OR TYPE EQ C | 02 | 01 |

-continued

|  |  | Linkage Array | |
|---|---|---|---|
|  |  | Primary Link | Secondary Link |
| Card #5 | AND CLASS EQ 53 | 03 | 01 |

On the other hand, the function IF(CODE EQ 1 AND TYPE EQ A) OR (TYPE EQB B) OR (TYPE EQ C AND CLASS EQ 53) would be represented by:

|  |  | Primary Link | Secondary Link |
|---|---|---|---|
| Card #1 | IF CODE EQ 1 AND TYPE EQ A | 01 | 01 |
|  |  | 01 | 02 |
| Card #2 | OR TYPE EQ B | 01 | 01 |
| Card #3 | OR TYPE EQ C AND CLASS EQ 53 | 01 | 01 |
|  |  | 01 | 02 |

Another slightly more complex example is given below representing the logical function IF(CODE EQ 1 AND TYPE EQ A) OR (CODE EQ 2 AND TYPE EQ B) AND (CLASS EQ 5 AND GRP EQ L) OR (CLASS EQ 7 AND GRP EQ P AND PLAN EQ RR):

|  |  | Primary Link | Secondary Link |
|---|---|---|---|
| Card #1 | IF CODE EQ 1 AND TYPE EQ A | 01 | 01 |
|  |  | 01 | 02 |
| Card #2 | OR CODE EQ 2 AND TYPE EQ B | 01 | 01 |
|  |  | 01 | 02 |
| Card #3 | AND CLASS EQ 5 AND GRP EQ L | 02 | 01 |
|  |  | 02 | 02 |
| Card #4 | OR CLASS EQ 7 AND GRP EQ P AND PLAN EQ RR | 02 | 01 |
|  |  | 02 | 02 |
|  |  | 02 | 03 |

A study of the linkage arrays in these examples in relation to the actual logical function will reveal that in sequentially evaluating this condition set, each term (parenthetical expression or individual query statement) is mandatory for satisfying the condition set only if the set of links associated with the next term is a higher number than the previous link or if it is the last term in a condition set. Thus, in this sense, with respect to primary links in the last given example, only the query statements on Card #2 and Card #4 are mandatory. With respect to the secondary links, all query statements on these two cards are mandatory.

Perhaps another way to visualize the linkage array structure is to analogize it to an outline structure with headings corresponding to primary links and subheadings corresponding to secondary links.

In this type of analogy, the just previous linkage array example becomes:

01. Heading
  01. CODE EQ 1
  02. TYPE EQ A
  *01. CODE EQ 2 ;p2 *02. TYPE EQ B
02. Heading
  01. CLASS EQ 5
  02. GRP EQ L
  *01. CLASS EQ 7
    *02. GRP EQ P
      *03. PLAN EQ RR Using the already given criteria, the mandatory query statements are indicated by an "*". It will be seen that this means that, at each outline level, if at least one of the associated query statements is not satisfied, then the entire logical function will fail to be satisfied regardless of the outcome of subsequent query statements.

Accordingly, as the conditional set is being sequentially evaluated, if any mandatory terms fail or "flunk", then the entire condition set fails or flunks. (Assuming that optimum programming prevents testing of unnecessary terms. That is, assuming that the terms just prior to the mandatory terms on the same outline level have also flunked.) It should now be appreciated that since the linkage array permits easy determination of the mandatory query statements, it becomes possible to quickly flunk a whole condition set as soon as one mandatory query statement flunks thereby obviating any necessity for wasting further time in evaluating other terms of the set.

In the final analysis, each query statement will eventually result in three machine instructions, namely, a compare instruction, a conditional branch instruction and an unconditional branch instruction with the addresses (either absolute or relocatable) inserted in these instructions being dependent upon the logical linkage array entries for that particular query statement. As will be seen, the process of this invention results in insertion of addresses that will automatically flunk an entire condition set as soon as the first mandatory term flunks.

Accordingly, at the very outset, a skeleton set of three instructions (codes for compare, conditional branch and unconditional branch together with reserved spaces for associated address information) can be generated for each successive query statement in the condition set. Of course, the skeleton sets would be placed in the core storage area where the machine instructions are being compiled beginning just after the last compiled instruction as should be apparent to those in the art.

For reasons that will soon be apparent, the branch instructions in each set of 3 are initially set up with the high order address of the compare instruction for that very same set of 3. Thus, if no further change were made, an endless loop would result. Howver, when these initial addresses are incremented by multiples of the number (X) of locations occupied by the set of 3 instructions, then the branch instructions will be properly directed to some other set of 3 instructions as should be apparent. For instance, if an increment of 1X is used, a branch to the next successive set of 3 instructions (actually to the compare code thereof) will result. An increment of 2X results in a branch to the 2nd next set, etc.

Thus, by properly incrementing the conditional branch instruction address argument (the location to which control is transferred in case the query statement condition is satisfied), the proper branch may be made in conformance with the desired logic. Likewise, by properly incrementing the unconditional branch instruction address argument (the location to which control is transferred in case the query statement condition is not satisfied), the desired logical result may be achieved.

Basically, once the linkage array has been formed according to the previously mentioned criteria, an evaluation of the array entries begins from the bottom or end of the array working towards the top whereby an associated array having corresponding entries of "good" and "bad" incremental addresses is calculated by noting simple increasing/decreasing values of adjacent linkage array entries. That is, the good incremental address array of 1X, 2X, 3X, etc. will be used to increment initial address arguments in the conditional branch instructions, corresponding individual array entries being used with respectively corresponding instruction sets, as should be apparent. Likewise, the bad incremental address array of 1X, 2X . . . or FLUNK will be used to increment initial address arguments in the unconditional branch instructions.

A concrete example of this process will now be given to help in understanding the invention. Assume the following source deck cards:

| | |
|---|---|
| Card #1: | INFILE 200 CODE 10 2 N, TYPE 22 1 A, |
| Card #2: | CLASS 32 2 N, GRP 42 1 A PLAN 50 2 A 9999 |
| Card #3: | IF CODE EQ 1 AND TYPE EQ A |
| Card #4: | OR CODE EQ 2 AND TYPE EQ B |
| Card #5: | AND CLASS EQ 5 AND GRP EQ L |
| Card #6: | OR CLASS EQ 7 AND GRP EQ P AND PLAN EQ RR |

To ease later evaluation, the data descriptors are first tabulated in a library table as follows (although absolute addresses are used, those in the art will appreciate that any desired relocation factor may be applied to these addresses; also, the convention of referring to the 1st location as being 0000 is used for this example):

LIBRARY TABLE

| Field Name | Beginning Address of the field | Length of the field name | Length of the field | Type data |
|---|---|---|---|---|
| CODE | 0010 | 3 | 1 | N |
| TYPE | 0022 | 3 | 0 | A |
| CLASS | 0032 | 4 | 1 | N |
| GRP | 0042 | 2 | 0 | A |
| PLAN | 0050 | 3 | 1 | A |

Now, an intermediate query table is constructed which includes the logical linkage arrays (primary links=LINK 1; secondary links=LINK 2) as well as other data from the associated query statements:

INTERMEDIATE QUERY TABLE

| LINK 1 | LINK 2 | Relational Operator | Address of Left-hand Field Name | Length of Fields | Right-hand Field | GOOD Branch incremental address if Query True | BAD Branch incremental address if Query False |
|---|---|---|---|---|---|---|---|
| 01 | 01 | EQ | 0010 | 1 | 01 | | |
| 01 | 02 | EQ | 0022 | 0 | A | | |
| 01 | 01 | EQ | 0010 | 1 | 02 | | |
| 01 | 02 | EQ | 0022 | 0 | B | | |
| 02 | 01 | EQ | 0032 | 1 | 05 | | |
| 02 | 02 | EQ | 0042 | 0 | L | | |
| 02 | 01 | EQ | 0032 | 1 | 07 | | |

INTERMEDIATE QUERY TABLE-continued

| LINK 1 | LINK 2 | Relational Operator | Address of Left-hand Field Name | Length of Fields | Right-hand Field | GOOD Branch incremental address if Query True | BAD Branch incremental address if Query False |
|---|---|---|---|---|---|---|---|
| 02 | 02 | EQ | 0042 | 0 | P | | |
| 02 | 03 | EQ | 0050 | 1 | RR | | |

Mandatory Query Statements

The entries in the last two columns are, of course, the good and bad incremental address arrays and are calculated starting from the linkage array starting from the bottom or end and utilizing the knowledge that each query statement will result in three fixed length machine instructions of X bytes. That is, for instance, in the IBM 360 series of computers, a compare instruction requires 6 bytes, a conditional branch requires 4 bytes and an unconditional branch requires 4 bytes for a total of 14 bytes. Thus, in compiling the machine executable instructions (elsewhere in core storage), each line on the above link table will result in using 14 bytes of core storage. Accordingly, as will be seen, the branch instruction addresses will always be incremented by multiples of X bytes (14 in the case of the IBM 360 series) except, of course, for the "flunk" address which will be a predetermined address or at least an address that is always available in a predetermined location such as a given register as should be apparent to those in the art.

In compiling the actual machine instructions corresponding to the 9 query statements in the exemplary condition set above, the next 9X storage locations would be set up in skeleton form with the 9 sets of 3 machine instructions. As previously mentioned each branch instruction is initially set up with the core address of the first instruction (compare) in that particular set of 3 instructions. For instance, assume a machine operation code of "C" for compare, a code of "B" for a conditional branch (with the condition designated by filing in the blank position) and with a code of "B" for an unconditional branch and with 4 position addresses being utilized. Thus, each set of 3 instructions would take up 20 positions (assuming 1 character per position of core storage).

Thus assuming that the last position of the just previously compiled machine instructions is in location 1000, then the next 180 positions of core (i.e., locations 1001-1180 inclusive) would be initialized as follows starting in location 1001:

```
"C-- --B__1001 B 1001 C-- --B__1021 B 1021
 C-- --B__1041 B 1041 C-- --B__1061 B 1061
 C-- --B__1081 B 1081 C-- --B__1101 B 1101
 C-- --B__1121 B 1121 C-- --B__1141 B 1141
 C-- --B__1161 B 1161"
```

Of course, the addresses for the compare instructions may simply be taken from the intermediate query table (the constants for the right-hand field being stored in known locations) as should be apparent to those in the art. Likewise, the conditional branch code may be completed in each case by referring to the proper relational operator in the intermediate query table as should be apparent. (All are branch if equal in this example.) The only problem is in properly incrementing the addresses in the branch instructions by a multiple of X (20 in the example).

Starting at the bottom of the intermediate query table, since this is the last term of a condition set, it is mandatory and the "bad" address should be the flunk address (i.e. the argument of the last unconditional branch) while the "good" address should be directed to the next instruction after the condition set (i.e. location 1181 in the example). Since the conditional branch instruction is already set to branch back to its associated compare, it only needs to be incremented by X (20 in the example) to result in the proper final result. Therefore, the "good" incremental address should be "0020" for the associated entry in the intermediate query table.

The next to the bottom line is also a mandatory query statement so that its "bad" address is the flunk address while the incremental "good" address is again X or 20 in this example. That is, even if this query statement is satisified, the next one must still be evaluated.

The third line from the bottom is also mandatory, so the "bad" adddress is the flunk address while the "good" incremental address is again 0020.

The fourth line up from the bottom is not mandatory so the "bad" address is an increment of 0020 and the "good" incremental address should be 0080 so that if the queries on Card #5 are satisfied, the queries on Card #6 will be bypassed as is indicated by the OR connector at the beginning of Card #6.

Actually, the last good incremental address will always be 1X while the last bad incremental address will always be FLUNK. Thereafter, each successively lower order entry in the good and bad address arrays may be calculated by simply comparing adjacent values of corresponding linkage array entries and the next higher good and bad address array entries.

For instance, for any array entry level n, the good address array entries good (n) will always be 1X unless:

(1) The primary links LINK1(n) and LINK1(n+1) are equal and (2) The secondary link LINK2(n+1) is lower than the secondary link LINK2(n).

If both these conditions are satisfied, then the good (n) entry should be set at (m+1) X where m equals the number of adjacent higher order entries for that same primary link LINK1(n) value.

Likewise, the bad address array entries bad (n) will always be FLUNK for the last entry level corresponding to any constant value of LINK1(n).

After these FLUNK values are determined, all other FLUNK bad (n) address array entries must meet the following criteria:

(1) The secondary links LINK2(n) must be lower than LINK2(n+1) and (2) The bad address entry for the next higher level bad (n+1) must also be a FLUNK.

If the bad (n) entry does not meet these criteria, then it is set at the incremental value (m+1) X where m equals the number of adjacent higher level non-FLUNK bad array entries.

Accordingly, following these rules, the last two columns in the intermediate query table (for the example X=20) can be calculated and filled in as shown below:

| Array Entry Level n | LINK1 | LINK2 | Good Address | Bad Address |
|---|---|---|---|---|
| 1 | 01 | 01 | 0020 | 0040 |
| 2 | 01 | 02 | 0060 | 0020 |
| 3 | 01 | 01 | 0020 | FLUNK |
| 4 | 01 | 02 | 0020 | FLUNK |
| 5 | 02 | 01 | 0020 | 0040 |
| 6 | 02 | 02 | 0080 | 0020 |
| 7 | 02 | 01 | 0020 | FLUNK |
| 8 | 02 | 02 | 0020 | FLUNK |
| 9 | 02 | 03 | 0020 | FLUNK |

Assuming that location 9999 has been assigned to FLUNK, then the compiled machine branch instructions would be modified by incrementing the initialized addresses therein with the respectively corresponding good and bad address increments shown in the above table. Of course, where a FLUNK is encountered, the initial address would be entirely replaced by 9999 as should be apparent.

Thus, the final result (again leaving out the compare instruction address arguments and the conditional branch qualifier) in locations 1001 through 1180 would be as follows:

```
"C-- --B__1021 B 1041 C-- --B__1081 B 1041
 C-- --B__1061 B 9999 C-- --B__1081 B 9999
 C-- --B__1101 B 1121 C-- --B__1181 B 1121
 C-- --B__1141 B 9999 C-- --B__1161 B 9999
 C-- --B__1181 B 9999"
```

As those in the art will appreciate, except for a few unnecessary unconditional branches to the very next location, this set of machine instructions represents the optimum result in core storage space and object program execution time. The departure from the optimum could, of course, be eliminated entirely by writing another routine to remove the unnecessary branches and to move the remaining statements into adjacent locations while recalculating the changed instruction address in the process. However, as a practical matter, the very small improvement thus obtained would usually be more than offset by the added compiler complexity.

Now referring to FIG. 1, a block diagram is shown to provide an overview of a typical compiler system that may be employed in the practice of this invention.

To begin with, a compiler executive routine ETEXEC is called into core storage by, perhaps, a manufacturer's executive routines. Then machine control is passed to ETEXEC at start point 10. Then, ETEXEC calls in the actual compiler programs ETMAIN and machine control is passed to ETMAIN at block 12. ETMAIN, in turn, reads in the source deck cards, processes these statements and constructs a machine instruction program in core to carry out the user's intentions as specified on the source cards as noted in block 14. At block 16, machine control is then transferred to the just compiled instructions whereupon the input files are examined as per the instructions and the required output files are created. If the output requires storing before listing, then control is passed back to ETEXEC which, in turn, calls in available sort routines from the system library as shown by blocks 18, 20 and 22. Then, ETMAIN is called back in at 24, 26 to actually cause any desired listing outputs, etc. from the output files (i.e. tapes, discs, etc.) before an end of run condition is checked at 28. When the end of the run is detected, control will be given back to the manufacturer's executive routine at 30 to cause a normal EOJ as should be apparent to those in the art.

In fact, the overall general process shown in FIG. 1 should be familiar to those in the art. The process of this invention is performed at block 14 and is shown in more detail in the succeeding figures.

FIG. 2 is a more detailed flow diagram of a typical compiler that might be used within block 14 of FIG. 1. However, here again, the general overall process depicted in FIG. 2 should already be familiar to those in the art. The actual novel process of this invention is itself shown in detail in FIGS. 3, 4 and 5.

Referring to FIG. 2, the compiler first reads and stores the source deck card statements at 32. Then, at 34, tables similar to the library table are constructed to more conveniently represent the data descriptive information contained in the first data describing source statements.

At block 36, the previously mentioned intermediate query table with the logical linkage array is constructed (shown in detail in FIGS. 3 and 4) from source statement condition sets. The query table is then processed at 38 to fill in the incremental "good" and "bad" address entries and to actually compile the machine executable instructions as previously discussed (shown in detail in FIG. 5).

If, after any given condition set is satisfied, there are mathematical calculations to be made, then conventional compiling techniques are used to construct the necessary machine language instructions at 40. If more condition sets are in the source deck, then the steps indicated at blocks 36, 38 and 40 are repeated by a branch at 42.

Further, if a sort is required by the source statements, a branch is made at 44 to a set of conventional compiling statements designed to generate the necessary entry parameters and control instructions for utilizing an available manufacturer's sort routine as shown at 46. Thereafter, any necessary machine print instructions are generated at 48 and 50 while any necessary linkages to output data files are set at 52.

At this point, the compilers job (box 14 in FIG. 1) is finished and control is passed to the just compiled machine instructions. Operating upon these instructions, the input files are processed, the output files sorted and/or listed, etc. as should be apparent to those in the art.

The detailed logic in FIGS. 3 and 4 depicts an exemplary embodiment of the process for building the logic linkage array previously discussed. Here the primary links are denoted by LINK1(n) and the secondary links are denoted by LINK2(n) with the subscript n indicating the entry position in the array (i.e. the sequence number of the query statement corresponding to the particular linkage array entry).

At the beginning of evaluating any given condition set, both LINK1(1) and LINK2(1) are set to 01. n is also initialized to 01 at box 100. Then, the particular source statement being considered is scanned for the next logical connector. When one is found, N is incremented at 102 and an end of card condition is checked at 104. Provided the end of the card has not been passed, the value of the discovered connector is checked at 106. If an "OR" connector exists, then the new entry for LINK1(n) and LINK2(n) are the same as the just previous values as indicated at 108. If an "AND" connector is discovered, the LINK2(n) value is incremented while LINK1(n) stays the same as the just previous entry as shown at 110.

In any event these steps are repeated until an end of card condition is detected at 104 at which time, control is transferred to FIG. 4 and the next card image is obtained at 112. If an end of condition set (new IF or a math computation statement encountered) then the logic linkage array is complete and control passes to FIG. 5 where the array is evaluated and the good and bad address increment array entries are calculated. However, if the end of the condition set is not detected, then the new LINK1 entry is incremented if the first word on the new card is an AND and not incremented if it is an OR. Control then passes back to FIG. 3 where the LINK2 values for plural query statements on the new card are calculated as before.

This is, of course, merely an exemplary embodiment of the process of constructing the unique logical linkage array described above. Basically, primary links (LINK1) are incremented only when new cards begin with an "AND" connector while secondary links (LINK2) are incremented only when an "AND" connector is embedded within a card between two query statements thereon. There are, of course, both a primary link and a secondary link entry in the logic linkage array for each query statement in a given condition set. The exemplary embodiment for generating LINK2 values is shown in FIG. 3 while the exemplary embodiment for generating LINK1 values is shown in FIG. 4.

Those in the art will also appreciate that the basic processes depicted in FIGS. 3 and 4 could be modified to accept shorthand notations for logical connectors if desired to further simplify the source level language. For instance, the single source query statement "VALUE EQ 1, 2, 3, 4" could be interpreted as four separate query statements connected by OR connectors by testing for the commas and adding a conventional routine to perform the expansion. Similarly, the query statement "VALUE EQ 1-4" can be expanded into plural query statements.

After the linkage array has been completed as shown in FIGS. 3 and 4, the array is evaluated by making simple checks of increasing/decreasing LINK1 and LINK2 values to generate the good and bad incremental addresses for the intermediate query table as previously discussed. As noted before, once these incremental good and bad addresses are known, it is a straightforward matter of incrementing the initial addresses in a corresponding set of machine branch instructions to complete the necessary machine instruction compilation.

Referring to FIG. 5, the loop represented by elements 120, 122, 124, 126 and 128 shows an exemplary embodiment of a technique for obtaining initial good incremental address entries based solely on comparing adjacent values of LINK1 in the linkage array. These initial values of good addresses are then modified by referring to compares of adjacent LINK2 values in the array as shown by the loop represented by elements 130, 132, 134, 136 and 138.

First, starting with the last entry and working upwards, the good incremental address is run up from 1X (X=20 in the previously discussed example) to 2X, 3X, etc. until a decrease in the value of the corresponding LINK1 is noted. Then the process starts over again at 1X, 2X, 3X, . . . etc. until the top of the table is reached.

Second, again starting from the bottom and working upwards, the initial value for the good incremental address is changed to 1X if the just preceding LINK2 value is higher than the directly corresponding LINK2 value. A careful application of the process employed in these two loops with respect to the previously discussed example having X=20 will verify those results for good address array entries.

Next, the bad incremental addresses are generated by two entirely analogous loops.

First, the loop comprising elements 138, 140, 142, 144, 146 and 148 results in placing 1X bad incremental addresses in all entries unless the corresponding LINK1 value has just decreased in which case the special predetermined FLUNK address is inserted. Of course, evaluation is again carried out from bottom to top.

Secondly, the loop comprising elements 150, 152, 154, 156, 158, 160 and 162 again scans from the bottom to the top and changes entries where the corresponding LINK2 value has just descreased. If such a decrease is noted and the next higher bad address entry is the FLUNK address, then that bad address is changed to FLUNK also. On the other hand, if the just previous bad address is not a FLUNK, then the bad address under consideration is incremented by 1X from the just previous bad address as will be apparent from FIG. 5.

As those in the art will appreciate, any conventional general purpose data processor may be used to practice this invention. For instance, an IBM Model 360/30 computer having a 32K memory, a printer and a reader comprises one such type of conventional computer configuration. Furthermore, the compiler of this invention may be written in any conventional programming language such as COBOL, FORTRAN, etc., and/or actual machine level or assembly level languages adapted to particular computers. For instance, an appropriate IBM Basic Assembly language for the IBM Model 360/30 computer previously mentioned is described in an IBM publication form A22-6821-5, the Jan. 13, 1967 edition entitled "IBM System/360 Principles of Operation" and/or other IBM publications available through the IBM Corporation. Using this language designed for the 360 system, the flow charts shown in the Figures may be readily reduced to an actual program as will be appreciated. For instance, the entire FIG. 4 segment would become:

| FIG. 4 | | Program Instruction | | Explanation |
| --- | --- | --- | --- | --- |
| Pass to next card image | B | BAL | RIO,GETCARD | Link to subroutine which issues a GET command to read the next card. The system returns automatically to this line of coding after reading this card. |

-continued

| FIG. 4 | | Program Instruction | | Explanation |
|---|---|---|---|---|
| End of condition set? | | CLC | FRSTWRD,AND | Compare the first word on the newly read card to "AND". |
| | | BE | AND/OR | Branch if equal to instruction at location AND/OR. |
| | | CLC | FRSTWRD,OR | Compare the first word on the card to "OR". |
| ◯ | | BNE | C | Branch if not equal to instruction at location C. |
| First word on card | AND/OR | CLC | FRSTWRD,AND | Compare first word to "AND". |
| | | BE | SETAND | Branch if equal to instruction at location SETAND. |
| LINK 1(n)= Link 1(n−1) Link 2(n)= Link 2(n−1) | SETOR | MVC | LINK1, LINK1-16 | Set present LINK1 value to previous LINK1 value. |
| | | MVC | LINK2, LINK2-16 | Same for LINK2 |
| Ⓐ | | B | A | Unconditional branch to the instruction at location A. |
| LINK1(n)= LINK1(n−1) + 1 LINK2(n) = 1 | SETAND | MVC | LINK1, LINK1-16 | Set present LINK1 value to previous LINK1 value. |
| | | AP | LINK1,PAK1 | Add +1 to LINK1 where +1 is stored in location PAK1. |
| | | ZAP | LINK2,PAK1 | Zero LINK2 and add +1 thereto. |
| Ⓐ | | B | A | Unconditional branch to instruction at location A. |

Of course, if higher level programming languages are used fewer separate program instructions may be necessary to implement the program segments as will be appreciated.

Although only one exemplary embodiment of this invention has been described in detail, those skilled in the art will readily appreciate that many modifications of the exemplary method are possible without materially changing the structure of the resulting logical linkage array or the corresponding good and bad incremental addresses which may be so advantageously employed in efficiently compiling an almost optimum set of machine instructions for evaluating a condition set. Accordingly, all such modifications are intended to be included within the scope of this invention.

What is claimed is:

1. A method to be carried out within a digital computer under programmed control for automatically evaluating a logic condition set composed of query statements connected by logical connectors and expressed in high level computer program source statements and for automatically compiling a compact and efficient set of machine executable instructions corresponding thereto, said method comprising the steps of:
constructing an array of logical linkage codes having at least one entry for each query statement in the condition set with the value of successive entries in the array being assigned in dependence upon the particular type of logical connector adjoining the respectively associated query statement,
scanning the resulting array of logical linkage codes in a predetermined order and comparing the values of adjacent entries to determine relative ordering therebetween, and
computing the necessary addresses for insertion in branch instructions included within said set of machine instructions in dependence upon said relative ordering.

2. A method as in claim 1 further comprising the steps of:
performing said set of machine executable instructions in skeleton form with a subset of at least one compare, one conditional branch and one unconditional branch instruction corresponding to each query statement and with address arguments for the branch instructions being intialized to correspond to the address of the compare instruction of its associated subset, and wherein
said computing step comprises:
constructing an array of good incremental addresses with each entry corresponding to a particular subset of instructions and with the value of each entry being calculated in dependence upon said relative ordering of corresponding adjacent linkage array entries,
constructing an array of bad incremental addresses with each entry corresponding to a particular subset of instructions and with the value of each entry being calculated in dependence upon said relative ordering of corresponding adjacent linkage array entries,
incrementing the address arguments of said conditional branch instructions with the value of the corresponding entry in the array of good incremental addresses, and
incrementing the address arguments of said unconditional branch instructions with the value of the corresponding entry in the array of bad incremental addresses.

3. A method to be performed by a digital computer under programmed control for automatically evaluating a logic condition set composed of query statements connected by logical connectors expressed in high level language computer program source statements and for automatically compiling a compact and efficient set of machine executable instructions corresponding thereto, each of said query statements comprising two terms corresponding to data fields and a relational operator relating the two fields such that an evaluation of the stated relation will provide a true or false result, said method comprising the steps of:

generating a primary link array of linkage codes with at least one entry for each query statement and with the value of successive entries in the array being sequentially assigned starting from a predetermined value for the initial entry and increasing only when the first logical connector in a newly encountered source statement is effectively considered an AND connector, generating a secondary link array corresponding to said primary link array of linkage codes with at least one entry for each query statement and with the value of successive entries in the array being sequentially assigned starting from a predetermined value for the initial entry and being increased only when an effective AND connector is encountered between query statements on the same source statement and being reset to the predetermined initial value each time a new source statement is encountered within said condition set, scanning the resulting primary and secondary link arrays in reverse order and comparing values of adjacent entries in each array to determine the relative ordering therebetween, and computing addresses for insertion in said set of machine instructions in dependence upon said relative ordering.

4. A method as in claim 3 further comprising the steps of:

generating said set of machine instructions in skeleton form with a subset of one compare, one conditional branch and one unconditional branch instruction corresponding to each entry in said primary link array and with address arguments for the branch instructions being initialized to correspond to that particular subset of instructions, and wherein said computing step comprises;

generating during said scanning step an array of good incremental addresses with each array entry corresponding to a particular subset of instructions and with the value of each entry being calculated in dependence upon said relative ordering of corresponding adjacent primary and secondary link array entries, generating during said scanning step an array of bad incremental addresses with each array entry corresponding to a particular subset of instructions and with the value of each entry being calculated in dependence upon said relative ordering of corresponding adjacent primary and secondary link array entries, determining which query statements are mandatory for the condition set and setting the corresponding entries in said array of bad incremental addresses to indicate a predetermined flunk address, incrementing the address arguments of said conditional branch instructions with the value of the corresponding entry in the array of good incremental addresses, incrementing the address arguments of said unconditional branch instructions with the value of the corresponding entry in the array of bad incremental addresses provided it is not the predetermined flunk address, and replacing the address argument of said unconditional branch instruction with the predetermined flunk address if the corresponding entry in the array of bad incremental addresses has been set to so indicate.

5. A method as in claim 4 wherein the incremental address entries in said arrays of good and bad incremental addresses are multiples of a predetermined constant X corresponding to the number of computer storage positions normally occupies by each of said subject of instructions.

6. A method as in claim 5 wherein said scanning step comprises at least one reverse ordered scan and wherein:

said generating an array of good incremental addresses step is performed during at least one of said reverse ordered scans wherein the last entry in this array is set at 1X and other entries are also set at 1X if the corresponding secondary link array entry is higher than the just previous secondary link array entry or if the corresponding primary link array entry is less than the next suceeding primary link array entry; otherwise, the entries are set at (M+1)X where M is the number of equal primary link array entries occurring just after the currently corresponding primary link entry, and said generating an array of bad incremental addresses step is performed duringat least one of said reverse ordered scans wherein the entires corresponding to the highest level for any given primary link array entries are set to indicate said flunk address and other entries in said bad address array are also set to indicate the flunk address if the corresponding secondary link array entry is less than the next higher level secondary link array entry and the next higher level bad address array entry is already set to indicate a flunk address; otherwise, the entries are set at (M+1)X where M is the number of adjacent higher level entries not set to indicate the flunk address.

7. A method as in claim 5 wherein said generating an array of good incremental addresses step comprises:

a first reverse ordered scan of the primary link array wherein all good address array entries are initialized by successively increasing the entry value by 1X until the corresponding primary link array entry decreases whereupon the good address entry is reset to begin again at 1X, and a second reverse ordered scan of the secondary link array wherein all good address array entries are reset to 1X if the corresponding secondary link array entry is greater than the next lower ordered secondary link array entry.

8. A method as in claim 7 wherein said generating an array of bad incremental addresses step comprises:

a third reverse ordered scan of the primary link array wherein all bad address array entries are initialized by setting the last entry to indicate the flunk address and all other bad address array entries are similarly set if the corresponding primary link array entry is less than the next higher ordered primary link array entry; otherwise the bad address array entries are initialized at 1X, and a fourth reverse ordered scan of the secondary link array wherein all bad address array entries are incremented by 1X from the next higher ordered entry provided that the corresponding secondary link array entry is less than the next higher ordered secondary link array entry and provided that the next higher ordered bad address array entry has not been set to indicate the flunk address.

9. The new use of general purpose electronic data processor for automatically evaluating a logic condition set composed of query statements connected by logical connectors and expressed in high level computer program source statements and for automatically compiling a compact and efficient set of machine executable instructions corresponding thereto, said new use comprising the steps of:

constructing an array of logical linkage codes having at least one entry for each query statement in the condition set with the value of successive entries in the array being assigned in dependence upon the particular type of logical connector adjoining the respectively associated query statement, scanning the resulting array of logical linkage codes in a predetermined order and comparing the values of adjacent entries to determine relative ordering therebetween, and computing the necessary addresses for insertion in branch instructions included within said set of machine instructions in dependence upon said relative ordering.

10. The method of claim 9 further comprising the steps of:

performing said set of machine executable instructions in skeleton form with a subset of at least one compare, one conditional branch and one unconditional branch instruction corresponding to each query statement and with address arguments for the branch instructions being initialized to correspond to the address of the compare instruction of its associated subset, and wherein said computing step comprises:

constructing an array of good incremental addresses with each entry corresponding to a particular subset of instructions and with the value of each entry being calculated in dependence upon said relative ordering of corresponding adjacent linkage array entries, constructing an array of bad incremental addresses with each entry corresponding to a particular subset of instructions and with the value of each entry being calculated in dependence upon said relative ordering of corresponding adjacent linkage array entries, incrementing the address arguments of said conditional branch instructions with the value of the corresponding entry in the array of good incremental addresses, and incrementing the address arguments of said unconditional branch instructions with the value of the corresponding entry in the array of bad incremental addresses.

11. The new use of a general purpose electronic data processor for automatically evaluating a logic condition set composed of query statements connected by logical connectors expressed in high level language computer program source statements and for automatically compiling a compact and efficient set of machine executable instructions corresponding thereto, each of said query statements comprising two terms corresponding to data fields and a relational operator relating the two fields such that an evaluation of the stated relation will provide a true or false result, said new use comprising the steps of:

generating a primary link array of linkage codes with at least one entry for each query statement and with the value of successive entries in the array being sequentially assigned starting from a predetermined value for the initial entry and increasing only when the first logical connector in a newly encountered source statement is effectively considered an AND connector, generating a secondary link array corresponding to said primary link array of linkage codes with at least one entry for each query statement and with the value of successive entries in the array being sequentially assigned starting from a predetermined value for the initial entry and being increased only when an effective AND connector is encountered between query statements on the same source statement and being reset to the predetermined initial value each time a new source statement is encountered within said condition set, scanning the resulting primary and secondary link arrays in reverse order and comparing values of adjacent entries in each array to determine the relative ordering therebetween, and computing addresses for insertion in said set of machine instructions in dependence upon said relative ordering.

12. The method of claim 11 further comprising the steps of:

generating said set of machine instructions in skeleton form with a subset of one compare, one conditional branch and one unconditional branch instruction corresponding to each entry in said primary link array and with address arguments for the branch instructions being initialized to correspond to that particular subset of instructions, and wherein said computing step comprises;

generating during said scanning step an array of good incremental addresses with each array entry corresponding to a particular subset of instructions and with the value of each entry being calculated in dependence upon said relative ordering of corresponding adjacent primary and secondary link array entries, generating during said scanning step an array of bad incremental addresses with each array entry corresponding to a particular subset of instructions and with the value of each entry being calculated in dependence upon said relative ordering of corresponding adjacent primary and secondary link array entries, determining which query statements are mandatory for the condition set and setting the corresponding entries in said array of bad incremental addresses to indicate a predetermined flunk address, incrementing the address arguments of said conditional branch instructions with the value of the corresponding entry in the array of good incremental addresses, incrementing the address arguments of said unconditional branch instructions with the value of the corresponding entry in the array of bad incremental addresses provided it is not the predetermined flunk address, and replacing the address arguments of said unconditional branch instructions with the predetermined flunk address if the corresponding entry in the array of bad incremental addresses has been set to so indicate.

13. The method of claim 12 wherein the incremental address entries in said arrays of good and bad incremental addresses are multiples of a predetermined constant X corresponding to the number of computer storage positions normally occupied by each of said subset of instructions.

14. The method of claim 13 wherein said scanning step comprises at least one reverse ordered scan and wherein:

said generating an array of good incremental addresses step is performed during at least one of said reverse ordered scans wherein the last entry in this array is set at 1X and other entries are also set at 1X if the corresponding secondary link array entry is higher than the just previous secondary link array entry or if the corresponding primary link array entry is less than the next succeeding primary link array entry; otherwise, the entries are set at $(M\pm 1)X$ where M is the number of equal primary link array entries occurring just after the currently corresponding primary link entry, and said generating an array of bad incremental addresses step is performed during at least one of said reverse ordered scans wherein the entries corresponding to the highest level for any given primary link array entries are set to indicate said flunk address and other entries in said bad address array are also set to indicate the flunk address if the corresponding secondary link array entry is less than the next higher level secondary link array entry and the next higher level bad address array entry is already set to indicate a flunk address; otherwise, the entries are set at $(M\pm 1)X$ wherein M is the number of adjacent higher level entries not set to indicate the flunk address.

15. The method of claim 14 wherein said generating an array of good incremental addresses step comprises:

a first reverse ordered scan of the primary link array wherein all good address array entries are initialized by successively increasing the entry value by 1X until the corresponding primary link array entry decreases whereupon the good address entry is reset to begin again at 1X, and a second reverse ordered scan of the secondary link array wherein all good address array entries are reset to 1X if the corresponding secondary link array entry is greater than the next lower ordered secondary link array entry.

16. The method of claim 15 wherein said generating an array of bad incremental addresses step comprises:

a third reverse ordered scan of the primary link array wherein all bad address arrray entries are initialized by setting the last entry to indicate the flunk address and all other bad address array entries are similarly set if the corresponding primary link array entry is less than the next higher ordered primary link array entry; otherwise the bad address array entries are initialized at 1X, and a fourth reverse ordered scan of the secondary link array wherein all bad address array entries are incremented by 1X from the next higher ordered entry provided that the corresponding secondary link array entry is less than the next higher ordered secondary link array entry and provided that the next higher ordered bad address array entry has not been set to indicate the flunk address.

17. A digital computer under programmed control for automatically evaluating a logic condition set composed of query statements connected by logical connectors and expressed in high level computer program source statements and for automatically compiling a compact and efficient set of machine executable instructions corresponding thereto, said computer comprising:

means for constructing an array of logical linkage codes having at least one entry for each query statement in the condition set with the value of successive entries in the array being assigned in dependence upon the particular type of logical connector adjoining the respectively associated query statement, means for scanning the resulting array of logical linkage codes in a predetermined order and comparing the values of adjacent entries to determine relative ordering therebetween, and means for computing the necessary addresses for insertion in branch instructions included within said set of machine instructions in dependence upon said relative ordering.

18. A computer as in claim 17 further comprising:

means for performing said set of machine executable instructions in skeleton form with a subset of at least one compare, one conditional branch and one unconditional branch instruction corresponding to each query statement and with address arguments for the branch instructions being initialized to correspond to the address of the compare instruction of its associated subset, and wherein said means for computing comprises:

means for constructing an array of good incremental addresses with each entry corresponding to a particular subset of instructions and with the value of each entry being calculated in dependence upon said relative ordering of corresponding adjacent linkage array entries, means for constructing an array of bad incremental addresses with each entry corresponding to a particular subset of instructions and with the value of each entry being calculated in dependence upon said relative ordering of corresponding adjacent linkage array entries, means for incrementing the address arguments of said conditional branch instructions with the value of the corresponding entry in the array of good incremental addresses, and means for incrementing the address arguments of said unconditional branch instructions with the value of the corresponding entry in the array of bad incremental addresses.

19. A digital computer under programmed control for automatically evaluating a logic condition set composed of query statements connected by logical connectors expressed in high level language computer program source statements and for automatically compiling a compact and efficient set of machine executable instructions corresponding thereto, each of said query statements comprising two terms corresponding to data fields and a relational operator relating the two fields such that an evaluation of the stated relation will provide a true or false result, said computer comprising:

means generating a primary link array of linkage codes with at least one entry for each query statement and with the value of successive entries in the array being sequentially assigned starting from a predetermined value for the initial entry and increasing only when the first logical connector in a newly encountered source statement is effectively considered an AND connector, means for generating a secondary link array corresponding to said primary link array of linkage codes with at least one entry for each query statement and with the value of successive entries in the array being sequentially assigned starting from a predetermined value for the initial entry and being increased only when an effective AND connector is encountered between query statements on the same source statement and being reset to the predetermined initial value each time a new source statement is encountered within said condition set, means for scanning the resulting primary and secondary link arrays in reverse order and comparing values of adjacent entries in each array to determine the relative ordering therebetween, and means for computing addresses for insertion in said set of machine instructions in dependence upon said relative ordering.

20. A computer as in claim 19 further comprising:

means for generating said set of machine instructions in skeleton form with a subset of one compare, one conditional branch and one unconditional branch instruction corresponding to each entry in said primary link array and with address arguments for the branch instructions being initialized to correspond to that particular subset of instructions, and wherein said computing step comprises;

means for generating during said scanning step an array of good incremental addresses with each array entry corresponding to a particular subset of instructions and with the value of each entry being calculated in dependence upon said relative ordering of corresponding adjacent primary and secondary link array entries, means for generating during said scanning step an array of bad incremental addresses with each array entry corresponding to a particular subset of instructions and with the value of each entry being calculated in dependence upon said relative ordering of corresponding adjacent primary and secondary link array entries, means for determining which query statements are mandatory for the condition set and setting the corresponding entries in said array of bad incremental addresses to indicate a predetermined flunk address, means for incrementing the address arguments of said conditional branch instructions with the value of the corresponding entry in the array of good incremental addresses, means for incrementing the address arguments of said unconditional branch instructions with the value of the corresponding entry in the array of bad incremental addresses provided it is not the predetermined flunk address, and means for replacing the address arguments of said unconditional branch instructions with the predetermined flunk address if the corresponding entry in the array of bad incremental addresses has been set to so indicate.

21. A computer as in claim 20 wherein the incremental address entries in said arrays of good and bad incremental addresses are multiples of a predetermined constant X corresponding to the number of computer storage positions normally occupied by each of said subset of instructions.

22. A computer as in claim 21 wherein said means for scanning comprises means for performing at least one reverse ordered scan and wherein:

said means for generating an array of good incremental addresses is active during at least one of said reverse ordered scans wherein the last entry in this array is set at 1X and other entries are also set at 1X if the corresponding secondary link array entry is higher than the just previous secondary link array entry or if the corresponding primary link array entry is less than the next succeeding primary link array entry; otherwise, the entries are set at $(M+1)X$ where M is the number of equal primary link array entries occurring just after the currently corresponding primary link entry, and said means for generating an array of bad incremental addresses step is active during at least one of said reverse ordered scans wherein the entries corresponding to the highest level for any given primary link array entries are set to indicate said flunk address and other entries in said bad address array are also set to indicate the flunk address if the corresponding secondary link array entry is less than the next higher level secondary link array entry and the next higher level bad address array entry is already set to indicate a flunk address; otherwise, the entries are set at $(M+1)X$ where M is the number of adjacent higher level entries not set to indicate the flunk address.

23. A computer as in claim 21 wherein said means for generating an array of good incremental addresses step comprises:

means for performing a first reverse ordered scan of the primary link array wherein all good address array entries are initialized by successively increasing the entry value by 1X until the corresponding primary link array entry decreases whereupon the good address entry is reset to begin again at 1X, and means for performing a second reverse ordered scan of the secondary link array wherein all good address array entries are reset to 1X if the corresponding secondary link array entry is greater than the next lower ordered secondary link array entry.

24. A computer as in claim 23 wherein said means for generating an array of bad incremental addresses step comprises:

means for performing a third reverse ordered scan of the primary link array wherein all bad address array entries are initialized by setting the last entry to indicate the flunk address and all other bad address array entries are similarly set if the corresponding primary link array entry is less than the next higher ordered primary link array entry; otherwise the bad address array entries are initialized at 1X, and means for performing a fourth reverse ordered scan of the secondary link array wherein all bad address array entries are incremented by 1X from the next higher ordered entry provided that the corresponding secondary link array entry is less than the next higher ordered secondary link array entry and provided that the next higher ordered bad address array entry has not been set to indicate the flunk address.

* * * * *